(No Model.)
H. A. KING.
VELOCIPEDE.
No. 353,071. Patented Nov. 23, 1886.
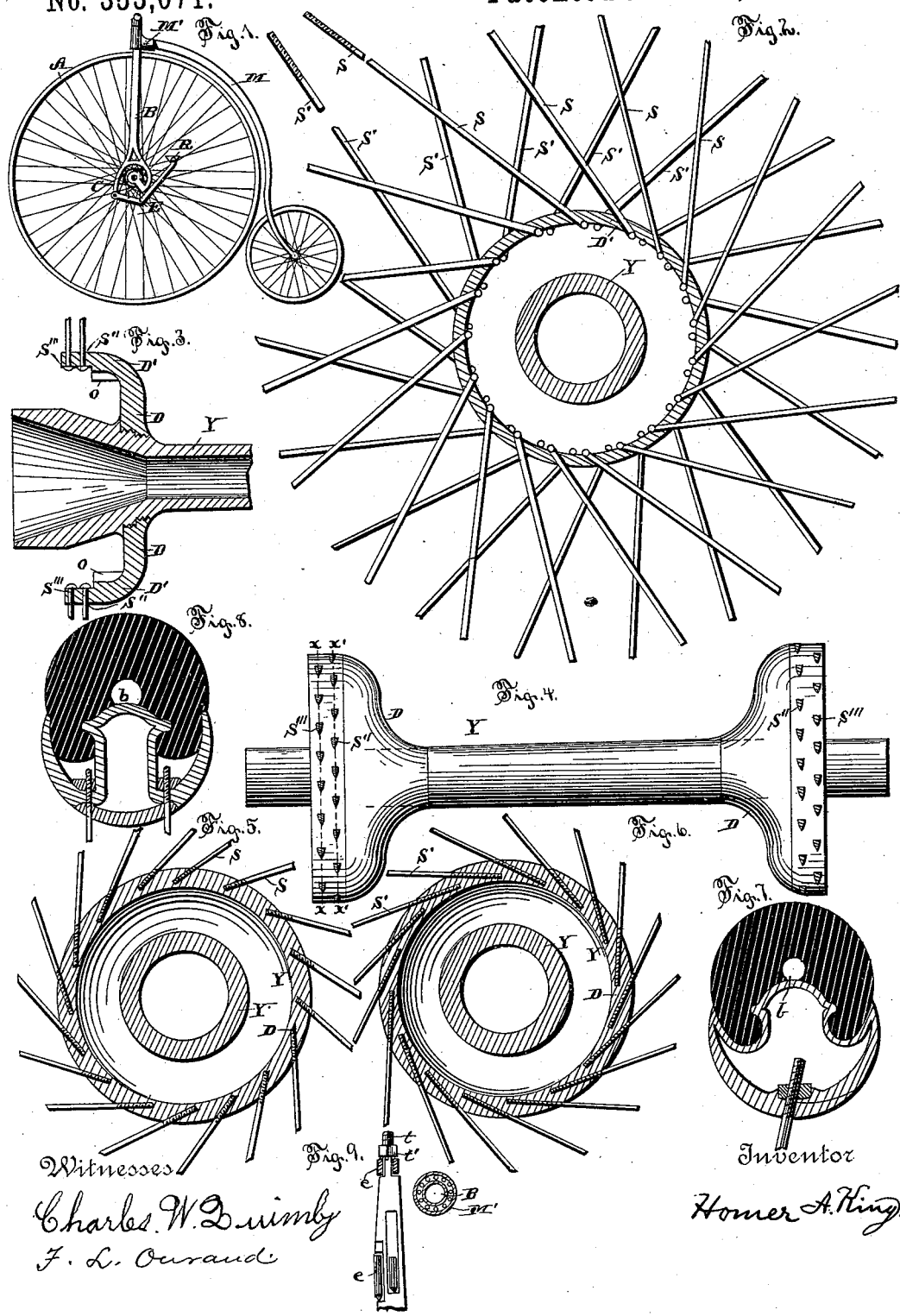
Witnesses
Charles W. Quimby
F. L. Durand
Inventor
Homer A. King

UNITED STATES PATENT OFFICE.

HOMER A. KING, OF SPRINGFIELD, MASSACHUSETTS.

VELOCIPEDE.

SPECIFICATION forming part of Letters Patent No. 353,071, dated November 23, 1886.

Application filed July 17, 1886. Serial No. 208,312. (No model.)

*To all whom it may concern:*

Be it known that I, HOMER A. KING, a citizen of the United States, residing at Springfield, in the county of Hampden and State of Massachusetts, have invented new and useful Improvements in Wheels for Velocipedes, which improvements are fully set forth in the following specification, the accompanying drawings making part of the specification.
My invention relates to improvements in velocipedes, and is adapted to bicycles, tricycles, and quadricycles or road-carriages drawn by horses.

It consists in four rows of spokes—two on each end of the hub—secured in the horizontal or nearly horizontal ratchet-flange $D'$ on a tangent, and with one end secured in the felly-rim.

It also consists in an improved construction of the hub, in an improved manner of using rollers in the steering-head, and in an improved construction of the rubber tire.

Some of these improvements are shown in connection with other improvements more fully described in my Letters Patent Nos. 327,397, 327,954, and 341,383, and application filed January 20, 1886.

Referring to the drawings, similar letters of reference indicate corresponding parts.

Figure 1 is a sectional view of my bicycle steered by the large front wheel, A, with the fork B bifurcated on each side of the wheel, one part forming a fulcrum for the lever E and the other part on the axle, as shown.

Fig. 2 is a cross-section view of Fig. 3. Fig. 2 shows the tangent spokes S and $S'$, with heads sunk in a reamed depression in the horizontal hub-flange $D'$, and the threaded end of the spokes with nut being in the felly-rim shown in Fig. 8.
Fig. 3 shows one end of the hub $y$ when the center is made by upsetting one end of a tube, then shaping by dies or drop-forging for my inclined spool or roller bearings and for the hub-flange D and $D'$. The openings $S'''$ are for the partially-tangent spokes, with head end in the hub and with thread end and nut in the felly-rim, as shown in Figs. 2 and 8. The opening $S''$ in Fig. 3 shows the openings for the inner row of spokes, which of course slope in the opposite direction to spokes S. I prefer this style with head in hub-flange and thread end and nut in the felly-rim, because broken spokes can be removed without drilling and loose spokes can be tightened with a spoke-grip. The threaded outer ends may be screwed direct into the felly-rim or into nipples extending through the felly-rim. Only one row of spokes need be used on each end of the hub if the spokes are direct, or nearly so, and if the hub is constructed with parallel bearings, as Fig. 4; but when constructed for my inclined roller-bearings, as in Fig. 3, the spokes could not be inserted without being tangent or partly tangent, which necessitates two rows on each end of the hub.

Figs. 5 and 6 are cross-sections of Fig. 4, taken in the lines $x\ x$ and $x'\ x'$, and both show the spokes S and $S'$ separately, with the screw ends in the horizontal ratchet-flange and the head end in the felly-rim; but, as before stated, I prefer the other style.

Fig. 7 shows my latest improved rubber tire with opening $b$ on the concave side to give greater elasticity to the tire.

Fig. 8 also shows the open space $b$ and the nuts on the end of the spokes in such position that they cannot turn; but the spoke is tightened by being turned by a spoke-tightener. These draw-nuts may be varied in their construction, and when inserted in the center of the rim, as in Fig. 7, may project upward to the top of the hole through the outward portion of the felly-rim where they were inserted, and thus be held from slipping out of place; or they may be made long and project inward through the inner portion of the hollow felly-rim; or they may be connected together by a metal ribbon, so that the threaded openings in the nuts shall register with the openings for the spokes.

Fig. 9 shows the steering-head, which may be solid or tubular. It unites the two arms B of the fork, and loosely passes up through the brace $M'$ of the backbone M, with the rollers $e$ between. These rollers each set on a pointed end in a slot in the steering-head, and cause it to turn easily in the brace $M'$. The steering-head passes through the handle-bar at $t'$, which is secured by a nut and cap-nut at $t$. There may be a half-round concave depression in the upper edge of $M'$, as shown, and a corresponding opening in the lower part of the handle-bar at this point, and balls inserted between, so that the handle-bar may be screwed down tightly upon M' and yet turn the fork B easily.

Having thus described my invention, what I claim as new, and desire to secure by Letters Patent, is—

1. In a velocipede-wheel, the combination of the horizontal or nearly horizontal spoke and ratchet annular D' at each end of a wheel-hub, with two rows of holes in each annular, through which straight or nearly straight spokes may be inserted on a tangent, or nearly on a tangent, and with the threaded outer ends secured to the felly-rim and the headed inner ends held in the annulars, and with the ratchets in the spoke and ratchet annulars nearer together than the holes for the spokes, the spokes being inserted, tightened, or removed without removing either ratchet or the rubber tire.

2. In a velocipede-wheel, the combination of a ratchet-rim and a horizontal or nearly horizontal spoke and ratchet annular at each end of the hub, and each annular pierced with two rows of holes for spokes, the ratchet-rims being between the holes on one annular and the holes on the other annular, and removable without removing the spokes, essentially as set forth.

3. The combination of a centrally-elevated hollow felly-rim and a rubber tire constructed with the opening $b$ between the centrally-elevated part of the felly-rim and the rubber tire, which fits the central elevation on each side of the opening $b$, the opening giving greater elasticity to the rubber tire outside of the central elevation of the felly-rim.

HOMER A. KING.

Witnesses:
CHARLES W. QUIMBY,
JOHN W. RUSSELL.